(12) United States Patent
Ash et al.

(10) Patent No.: US 12,380,882 B2
(45) Date of Patent: *Aug. 5, 2025

(54) SPEECH PROCESSING SYSTEM AND METHOD

(71) Applicant: THE CHANCELLOR, MASTERS, AND SCHOLARS OF THE UNIVERSITY OF CAMBRIDGE, Cambridge (GB)

(72) Inventors: Thomas William John Ash, Cambridge (GB); Anthony John Robinson, Cambridge (GB)

(73) Assignee: THE CHANCELLOR, MASTERS, AND SCHOLARS OF THE UNIVERSITY OF CAMBRIDGE, Cambridge (GB)

(*) Notice: Subject to any disclaimer, the term of this patent is extended or adjusted under 35 U.S.C. 154(b) by 49 days.

This patent is subject to a terminal disclaimer.

(21) Appl. No.: 16/906,775

(22) Filed: Jun. 19, 2020

(65) Prior Publication Data

US 2020/0320987 A1    Oct. 8, 2020

Related U.S. Application Data

(63) Continuation of application No. 15/773,946, filed as application No. PCT/GB2016/053456 on Nov. 4, 2016, now Pat. No. 10,783,880.

(30) Foreign Application Priority Data

Nov. 4, 2015  (GB) ..................................... 1519494

(51) Int. Cl.
*G10L 15/193* (2013.01)
*G09B 19/06* (2006.01)
(Continued)

(52) U.S. Cl.
CPC ............ *G10L 15/193* (2013.01); *G09B 19/06* (2013.01); *G10L 15/187* (2013.01); *G10L 25/51* (2013.01); *G10L 25/87* (2013.01); *G10L 25/78* (2013.01)

(58) Field of Classification Search
CPC ..... G10L 15/193; G10L 15/187; G10L 25/51; G10L 25/87; G09B 19/04
See application file for complete search history.

(56) References Cited

U.S. PATENT DOCUMENTS 4,805,219 A     2/1989  Baker et al.
5,819,223 A *  10/1998  Takagi .................. G10L 15/065
                                                   704/E15.009

(Continued)

OTHER PUBLICATIONS

International Search Report and Written Opinion for PCT/GB2016/053456, mailed Mar. 6, 2017.

(Continued)

*Primary Examiner* — Richemond Dorvil
*Assistant Examiner* — Ethan Daniel Kim
(74) *Attorney, Agent, or Firm* — Merchant & Gould P.C.

(57) ABSTRACT

A speech processing system includes an input for receiving an input utterance spoken by a user and a word alignment unit configured to align different sequences of acoustic speech models with the input utterance spoken by the user. Each different sequence of acoustic speech models corresponds to a different possible utterance that a user might make. The system identifies any parts of a read prompt text that the user skipped; any parts of the read prompt text that the user repeated; and any speech sounds that the user inserted between words of the read prompt text. The information from the word alignment unit can be used to assess the proficiency and/or fluency of the user's speech.

10 Claims, 5 Drawing Sheets

(51) Int. Cl.
  *G10L 15/187* (2013.01)
  *G10L 25/51* (2013.01)
  *G10L 25/78* (2013.01)
  *G10L 25/87* (2013.01)

(56) References Cited

U.S. PATENT DOCUMENTS

| | | |
|---|---|---|
| 6,389,394 B1 | 5/2002 | Fanty |
| 6,801,891 B2 | 10/2004 | Garner et al. |
| 7,054,812 B2 | 5/2006 | Charlesworth et al. |
| 7,062,441 B1 | 6/2006 | Townshend |
| 7,219,059 B2 | 5/2007 | Gupta et al. |
| 7,299,188 B2 | 11/2007 | Gupta et al. |
| 7,302,389 B2 | 11/2007 | Gupta et al. |
| 7,337,116 B2 | 2/2008 | Charlesworth et al. |
| 7,590,533 B2 | 9/2009 | Hwang |
| 7,668,718 B2 | 2/2010 | Kahn et al. |
| 8,457,959 B2 | 6/2013 | Kaiser |
| 8,494,850 B2 | 7/2013 | Chelba et al. |
| 8,959,014 B2 | 2/2015 | Xu et al. |
| 9,123,339 B1* | 9/2015 | Shaw .................. G10L 15/22 |
| 9,336,771 B2 | 5/2016 | Chelba |
| 9,424,834 B2 | 8/2016 | Simmons et al. |
| 2002/0022960 A1 | 2/2002 | Charlesworth et al. |
| 2002/0120447 A1 | 8/2002 | Charlesworth et al. |
| 2002/0120448 A1 | 8/2002 | Garner et al. |
| 2004/0006461 A1 | 1/2004 | Gupta et al. |
| 2004/0006468 A1 | 1/2004 | Gupta et al. |
| 2004/0230430 A1 | 11/2004 | Gupta et al. |
| 2004/0230431 A1 | 11/2004 | Gupta et al. |
| 2005/0203738 A1* | 9/2005 | Hwang ................. G10L 15/063 |
| | | 704/243 |
| 2006/0110711 A1 | 5/2006 | Julia et al. |
| 2006/0149558 A1 | 7/2006 | Kahn et al. |
| 2008/0040119 A1 | 2/2008 | Ichikawa et al. |
| 2008/0140401 A1 | 6/2008 | Abrrash et al. |
| 2008/0221893 A1 | 9/2008 | Kaiser |
| 2010/0145698 A1 | 6/2010 | Chen et al. |
| 2010/0145707 A1 | 6/2010 | Ljolje et al. |
| 2011/0307241 A1* | 12/2011 | Waibel .................... G06F 40/44 |
| | | 704/2 |
| 2012/0065976 A1* | 3/2012 | Deng ...................... G10L 15/14 |
| | | 704/256.1 |
| 2012/0078630 A1 | 3/2012 | Hagen et al. |
| 2013/0006612 A1 | 1/2013 | Xu et al. |
| 2013/0006623 A1 | 1/2013 | Chelba et al. |
| 2013/0325464 A1 | 12/2013 | Huang et al. |
| 2014/0141392 A1* | 5/2014 | Yoon ........................ G09B 5/04 |
| | | 434/156 |
| 2015/0348541 A1 | 12/2015 | Epstein et al. |
| 2015/0371633 A1 | 12/2015 | Chelba |

OTHER PUBLICATIONS

Search Report for British Patent Application No. 1519494.7, mailed May 20, 2016.

Search Report for British Patent Application No. 1519494.7, mailed Dec. 13, 2016.

\* cited by examiner $[ f_0 \; f_1 \; f_2 \; f_3 \; f_4 \; f_5 \; f_6 \; f_7 \; f_8 \; f_9 \; f_{10} \; f_{11} \; f_{12} \; f_{13} \; f_{14} \; f_{15} \; f_{16} \; f_{17} \; f_{18} \; f_{19} \; f_{20} \; f_{21} \; f_{22} \; f_{23} \; f_{24} \; f_{25} \; f_{26} \; f_{27} \; f_{28} ]^{utterance}$

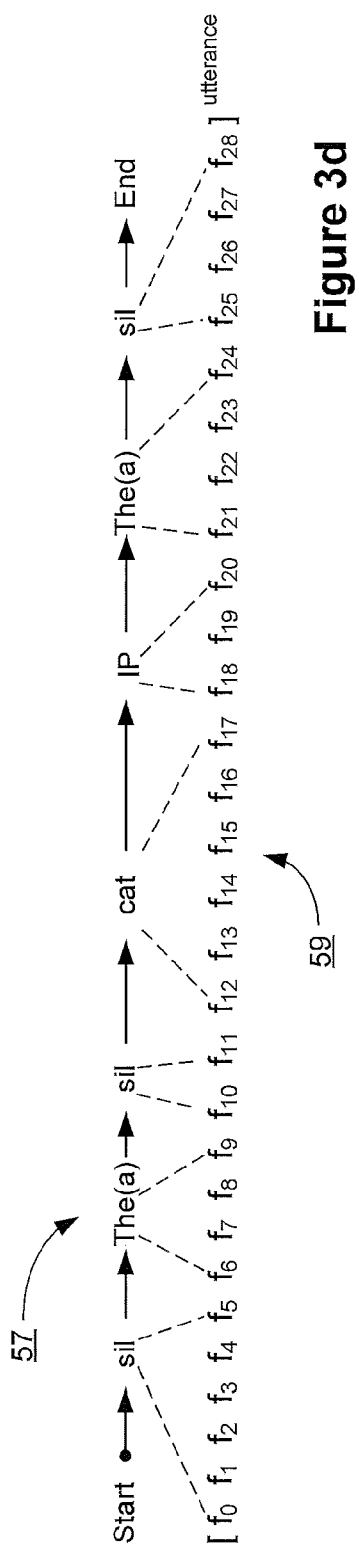
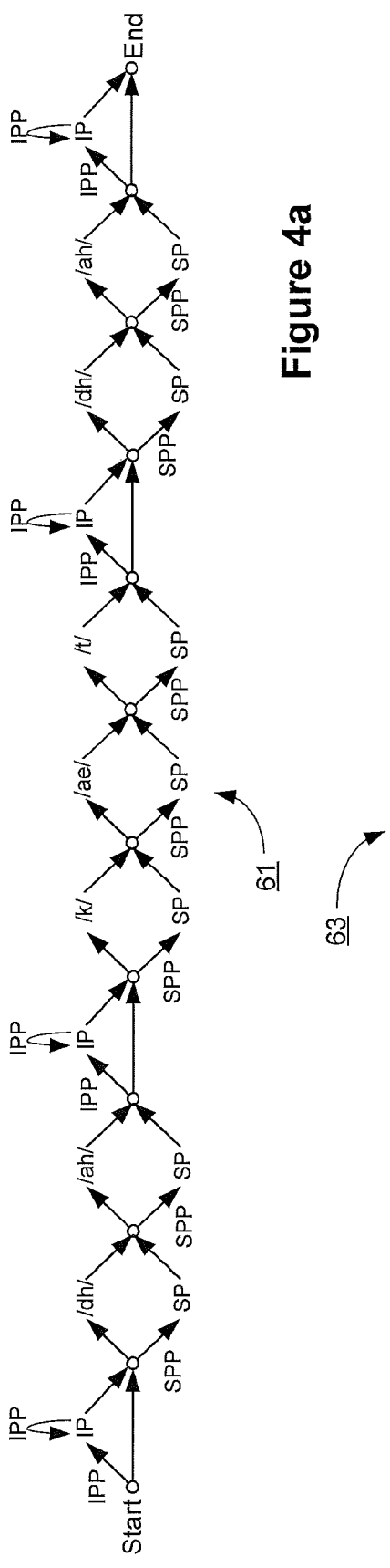
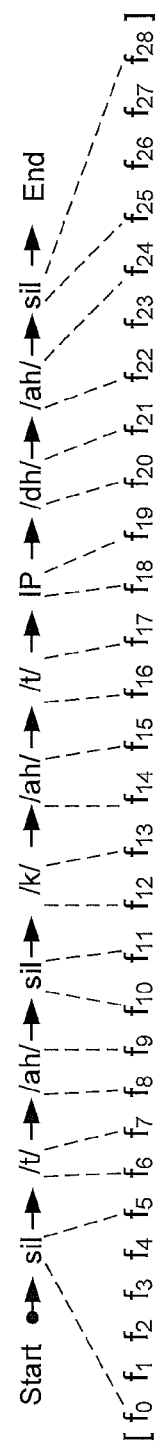
Figure 3d
Figure 4a
Figure 4b

SPEECH PROCESSING SYSTEM AND METHOD

This application is a continuation of U.S. patent application Ser. No. 15/773,946, filed 4 May 2018, which is a National Stage Application of PCT/GB2016/053456, filed 4 Nov. 2016, which claims benefit of British Patent Application No. 1519494.7, filed 4 Nov. 2015, which applications are incorporated herein by reference. To the extent appropriate, a claim of priority is made to each of the above-disclosed applications.

FIELD OF INVENTION

The present invention relates to a system and method for processing a user's speech. The invention has particular, although not exclusive, relevance to a system and method for assessing the fluency and proficiency of a user's spoken dialogue in a given language.

BACKGROUND OF THE INVENTION

Users that learn a foreign language often have to have an exam to determine their fluency and proficiency of the language they are learning. Typically this involves the user speaking a given sentence or phrase and a human examiner analyzing the spoken utterance and giving a score or mark indicating the examiner's opinion on the user's fluency and proficiency in the language. Such human marking can lead to delays in assessing and scoring each user—as the examiner has to consider each user in turn and there is a limit to the number of users that an examiner can consider in a given time period. Further, to avoid disparity between scores assigned by different examiners, often two or more examiners will consider the speech of each user before a score is assigned to each user. This adds further to the delay in obtaining examination results experienced by the user.

Recently proposals have been made to computerize the marking process in order to reduce the reliance on human examiners. However, it is difficult to create a computerized language assessment system that is able to determine a user's proficiency and/or fluency in a foreign language that matches well to the assessments made by human examiners. The present invention has been made to try to improve the accuracy of computerized assessment systems.

SUMMARY OF INVENTION

According to one aspect, the present invention provides a speech processing system comprising: an input for receiving an input utterance spoken by a user in response to a read prompt text; an acoustic model store that stores acoustic speech models; a read prompt data store that stores text data identifying the sequence of words in the read prompt; a data store that stores data defining a first network having a plurality of paths through the first network, each path representing a different possible utterance that a user might say in response to the read prompt text, the different paths allowing for: i) the user to skip part of the read prompt text; ii) the user to repeat part or all of the read prompt text; and iii) the user to insert speech sounds between words in the read prompt text; and a word alignment unit configured to align different sequences of said acoustic speech models with the input utterance spoken by the user, each different sequence of acoustic speech models corresponding to one of the different possible utterances that a user might make in response to the read prompt text as represented by a path through said first network, and to output an alignment result identifying: i) a matching possible utterance from all of the possible utterances represented by the first network that matches with the input utterance spoken by the user; ii) any parts of the read prompt text that the user skipped; iii) any parts of the read prompt text that the user repeated; and iv) any speech sounds that the user inserted between words of the read prompt text. In some embodiments, the word alignment unit also identifies a time alignment between words and sub-word units of the matching possible utterance and the input utterance spoken by the user.

The different paths of the first network allow for different dictionary pronunciations of one or more words in the read prompt text that have multiple known pronunciations; and the matching possible utterance identifies a likely pronunciation of any read prompt words spoken by the user that have multiple known pronunciations.

The word alignment unit may be configured to maintain matching scores for the alignments between the different sequences of acoustic speech models with the input utterance spoken by the user and may output the score for the matching possible utterance. The acoustic speech models may include one or more silence models and the word alignment unit may be configured to identify portions within the user's utterance that matches with the one or more silence models.

According to another aspect, the present invention provides a speech processing system comprising: an input for receiving an input utterance spoken by a user; a speech recognition system that recognises the input utterance spoken by the user and that outputs a recognition result comprising a sequence of recognised words and sub-word units corresponding to the input utterance; an acoustic model store that stores acoustic speech models; a word alignment unit configured to receive the sequence of recognised words and sub-word units output by the speech recognition system and to align a sequence of said acoustic speech models corresponding to the received sequence of recognised words and sub-word units with the input utterance spoken by the user and to output an alignment result identifying a time alignment between the received sequence of recognised words and sub-word units and the input utterance spoken by the user.

In either of the above aspects, the word alignment unit may be configured to output a sequence of sub-word units corresponding to a dictionary pronunciation of the matching possible utterance.

A sub-word alignment unit may also be provided that receives the sequence of sub-word units corresponding to the dictionary pronunciation, that determines where the input utterance spoken by the user differs from the dictionary pronunciation and that outputs a sequence of sub-word units corresponding to an actual pronunciation of the input utterance spoken by the user. The sub-word alignment unit may align the sequence of sub-word units corresponding to the dictionary pronunciation received from the word alignment unit with the input utterance spoken by the user whilst allowing for sub-word units to be inserted between words and for sub-word units of a word to be replaced by other sub-word units.

In one embodiment, the sub-word alignment unit is configured to generate a second network having a plurality of paths allowing for sub-word units to be inserted between words and for sub-word units of a word to be replaced by other sub-word units and wherein the sub-word alignment unit is configured to align acoustic speech models for the different paths defined by the second network with the input utterance spoken by the user. In this case, the sub-word alignment unit may maintain a score representing the closeness of the match between the acoustic speech models for the different paths defined by the second network and the input utterance spoken by the user.

The speech processing system may further comprise a speech scoring feature determining unit configured to receive and to determine a measure of similarity between the sequence of sub-word units output by the word alignment unit and the sequence of sub-word units output by the sub-word alignment unit.

The speech processing system may further comprise a free align unit configured to align acoustic speech models with the input utterance spoken by the user and to output an alignment result including a sequence of sub-word units that matches with the input utterance spoken by the user.

The speech processing system may also comprise a speech scoring feature determining unit configured to receive and to determine a plurality of speech scoring feature values for the input utterance. In this case, the speech scoring feature determining unit may be configured to determine a measure of similarity between the sequence of sub-word units output by the free align unit and the sequence of sub-word units output by the sub-word alignment unit. Alternatively, the speech scoring feature determining unit may be configured to determine a measure of similarity between the sequence of sub-word units output by the free align unit and the sequence of sub-word units output by the word alignment unit.

The speech scoring feature determining unit may be configured to determine a first measure of perplexity (which may be an entropy measure) of the recognition result output by the speech recognition system when compared with a first language model. The speech scoring feature determining unit may also be configured to determine a second measure of the perplexity of the recognition result output by the speech recognition system when compared with a second language model. The speech scoring feature determining unit may also be configured to determine a first ratio of the first and second measures of the perplexity of the recognition result output by the speech recognition system. A third measure of the perplexity may be determined of the recognition result output by the speech recognition system when compared with a third language model. In this case, the speech scoring feature determining unit may be configured to determine a second ratio of the first and third measures of the perplexity of the recognition result output by the speech recognition system and a third ratio of the second and third measures of the perplexity of the recognition result output by the speech recognition system.

In some embodiments, the first language model is trained using text output from the speech recognition system in response to input speech spoken by users having a first ability of the language, the second language model is trained using text output from the speech recognition system in response to input speech spoken by users having a second ability of the language, the second ability being greater than the first ability and the third language model is trained using text output from the speech recognition system in response to input speech spoken by users having a third ability of the language, the first ability being greater than the third ability.

The speech processing system may have a set of principle component analysis, PCA, weights representing a speech feature of a plurality of training input utterances spoken by a plurality of different training users of different language abilities in response to the read prompt text and wherein the speech scoring feature determining unit is configured to determine a PCA value representing the speech feature in the input utterance spoken by the user using the PCA weights. The speech feature may comprise at least one of: energy within the input utterance, the user's pitch within the input utterance; duration of silences within the input utterance, and duration of sub-word units within the input utterance.

A scoring unit may also be provided that receives the plurality of speech scoring feature values for the input utterance determined by the speech scoring feature determining unit and that generates a score representing the language ability of the user. Typically, the score represents the fluency and/or proficiency of the user's spoken utterance.

According to a further aspect, the invention provides a speech processing system comprising: an input for receiving a sequence of acoustic feature vectors representative of an utterance spoken by a user in response to a read prompt text; an acoustic model store that stores acoustic models of sub-word units; a read prompt data store that stores text data identifying the sequence of words in the read prompt; a data store that stores a network representing different possible utterances that a user might make in response to the read prompt text, the network including a plurality of paths each representative of a different possible utterance, the different paths allowing for: i) the user to skip part of the read prompt text; ii) the user to repeat part or all of the read prompt text; and iii) the user to insert speech sounds between words in the read prompt text; and a word alignment unit configured to align different sequences of said acoustic models with the input sequence of acoustic feature vectors representative of the utterance spoken by the user, each different sequence of acoustic models corresponding to one of the different possible utterances that a user might make in response to the read prompt text as defined by a path through said network, the word alignment unit identifying a possible utterance that matches with the input utterance, the possible utterance identifying any parts of the read prompt text that the user skipped, identifying any parts of the read prompt text that the user repeated, and identifying any speech sounds that the user inserted between words of the read prompt text.

According to a further aspect, the present invention provides a speech processing method comprising: receiving an input utterance spoken by a user in response to a read prompt text; aligning different sequences of acoustic speech models with the input utterance spoken by the user, each different sequence of acoustic speech models corresponding to one of a plurality of different possible utterances that a user might make in response to the read prompt text; and outputting an alignment result identifying: i) a matching possible utterance from all of the possible utterances that matches with the input utterance spoken by the user; ii) any parts of the read prompt text that the user skipped; iii) any parts of the read prompt text that the user repeated; iv) any speech sounds that the user inserted between words of the read prompt text; and v) a time alignment between words and sub-word units of the matching possible utterance and the input utterance spoken by the user.

According to a further aspect, the present invention provides a speech processing method comprising: receiving an input utterance spoken by a user; using a speech recognition system to recognise the input utterance spoken by the user and to output a recognition result comprising a sequence of recognised words and sub-word units corresponding to the input utterance; and receiving the sequence of recognised words and sub-word units output by the speech recognition system and aligning a sequence of acoustic speech models corresponding to the received sequence of recognised words and sub-word units with the input utterance spoken by the user; and outputting an alignment result identifying a time alignment between the received sequence of recognised words and sub-word units and the input utterance spoken by the user.

According to a further aspect, the present invention provides a speech analysis system for analysing the speech of a user, the system comprising: an input for receiving an input utterance spoken by the user in a language under test; a speech recognition system that recognises the input utterance spoken by the user and that outputs a recognition result comprising a sequence of recognised words and sub-word units corresponding to the input utterance; a speech scoring feature determining unit configured to: i) determine a first measure of perplexity of the recognition result output by the speech recognition system when compared with a first language model; ii) determine a second measure of the perplexity of the recognition result output by the speech recognition system when compared with a second language model; and iii) determine a first ratio of the first and second measures of the perplexity of the recognition result output by the speech recognition system; and a scoring unit operable to receive the first ratio determined by the speech scoring feature determining unit and configured to generate a score representing an ability of the user to speak the language under test using the first ratio.

In some embodiments, the speech scoring feature determining unit is configured to determine a third measure of the perplexity of the recognition result output by the speech recognition system when compared with a third language model, wherein the speech scoring feature determining unit is configured to determine a second ratio of the first and third measures of the perplexity of the recognition result output by the speech recognition system and wherein the scoring unit may be configured to generate a score representing the ability of the user to speak the language under test using the first ratio and the second ratio. In this case, the speech scoring feature determining unit may be configured to determine a third ratio of the second and third measures of the perplexity of the recognition result output by the speech recognition system and wherein the scoring unit may be configured to generate a score representing the ability of the user to speak the language under test using the first ratio, the second ratio and the third ratio.

According to another aspect, the present invention provides a speech analysis system for analysing the speech of a user, the system comprising: an input for receiving an input utterance spoken by a user in a language under test in response to a read prompt text; a speech processing system configured to process the input utterance to determine values of a speech feature during the input utterance; a data store comprising a set of principle component analysis, PCA, weights representing values of said speech feature during a plurality of training input utterances spoken by a plurality of different training users of different language abilities in response to the read prompt text; a speech scoring feature determining unit configured to determine a PCA value for the input utterance using the stored PCA weights and the values of said speech feature determined for the input utterance; and a scoring unit operable to receive the PCA value for the input utterance spoken by the user and to generate a score representing an ability of the user to speak the language under test using the PCA value.

BRIEF DESCRIPTION OF DRAWINGS

These and other aspects of the invention will become apparent from the following detailed description of exemplary embodiments which are described with reference to the accompanying drawings in which:

FIG. 3d illustrates an alignment result output by the word alignment unit;

FIG. 4a illustrates a network used by a phoneme alignment unit forming part of the system shown in FIGS. 1a and 1b to control alignment with the sequence of acoustic feature vectors representing the user's utterance;

FIG. 4b illustrates an alignment result output by the phoneme alignment unit;

OVERVIEW

As will become clear from the speech processing systems described below, the systems described herein are designed to process a user's speech to determine various speech features that are useful in assessing the fluency and/or proficiency of the user's speech. Whilst the system is described below for assessing the English language, the invention is clearly not so limited and the system can be used to process speech in any language.

The system of the preferred embodiment has two modes of operation—one called "read prompt" and one called "free speech". In the read prompt mode of operation, the user is given predetermined text to speak and in the free speech mode of operation the user is allowed to speak anything they wish. The system then analyses what the user said and calculates various speech features that relate to the way that the user spoke. These speech features are then used to determine a score representing the user's fluency and/or proficiency in the language being assessed (in this case English). The score can be determined in substantially real time—so that the user can be marked and graded immediately.

Figure 1A:
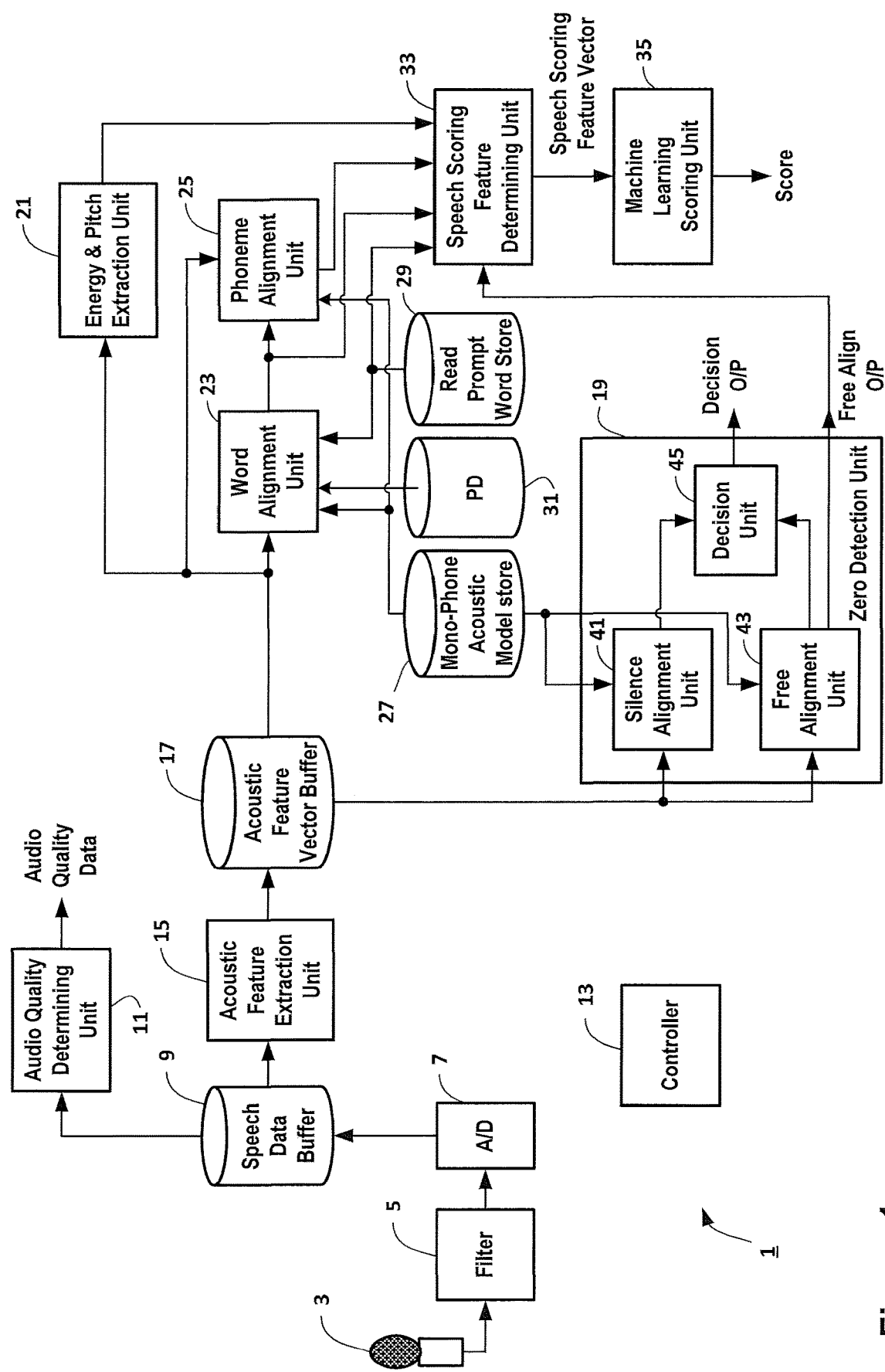
FIG. 1a is a block diagram illustrating the main system components for processing a user's speech utterance in response to prompted text.
Figure 1B:
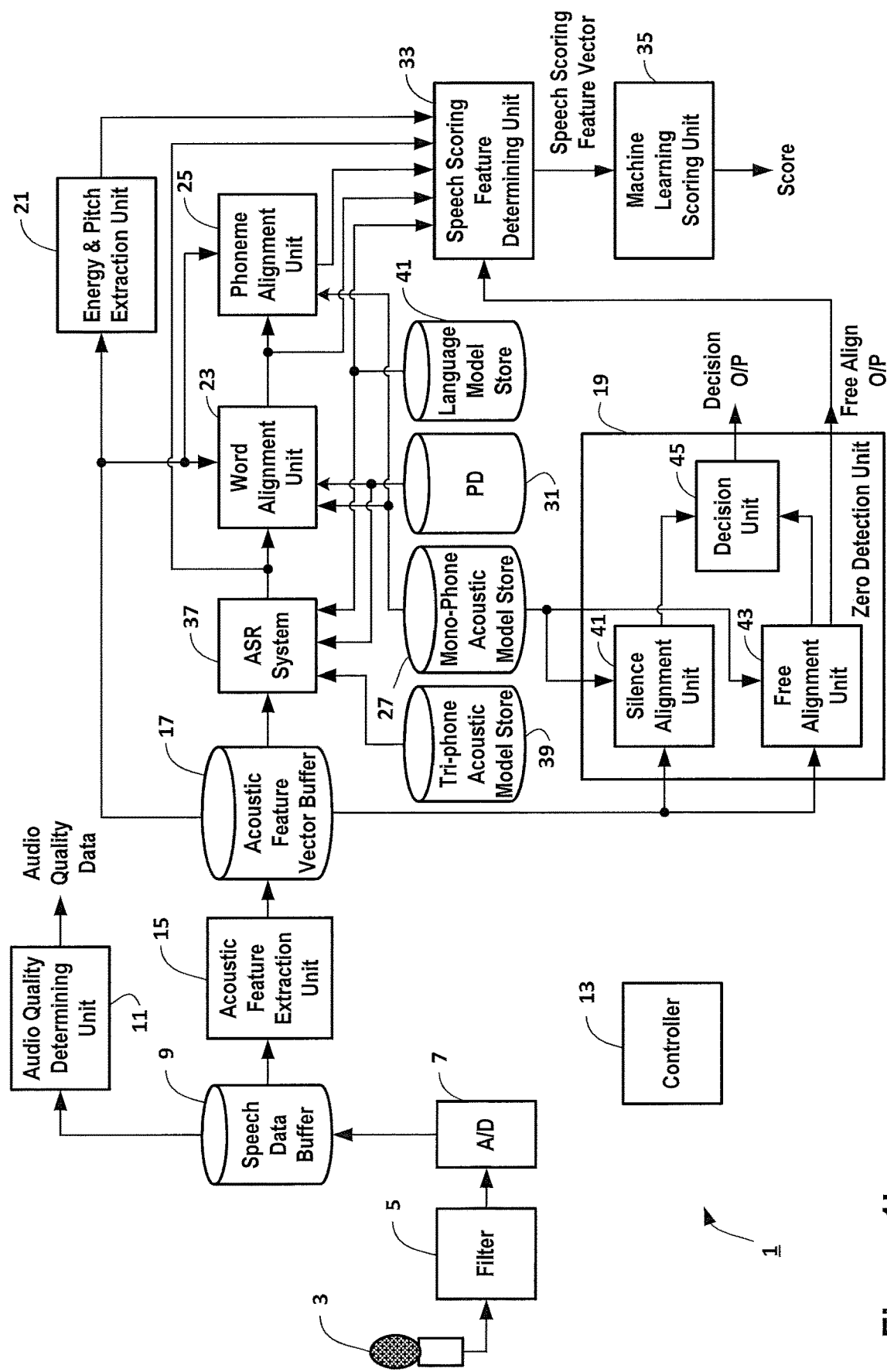
FIG. 1b is a block diagram illustrating the main system components for processing a user's free speech utterance.

A description will now be given of the way in which the system processes the user's speech and determines the score for the user. FIG. 1a and FIG. 1b are block diagrams illustrating the main components of the speech processing system 1 that is used in the preferred embodiment. The components that are illustrated may be implemented by dedicated hardware circuits (such as by using Field Programmable Gate Arrays or Application Specific Integrated Circuits), but typically will be implemented as software modules run on a conventional computer system (with a conventional memory and central processing unit(s)). The individual units illustrated in FIGS. 1a and 1b are represented in the manner shown for ease of understanding their operation and interworking. However, as those skilled in the art will appreciate, one or more or all of these units may be implemented in a single software package and so these units may not be discernible as separate units. FIG. 1a illustrates the main components used when the system 1 is operating in the "read prompt" mode of operation; and FIG. 1b illustrates the main components used when the system 1 is operating in the "free speech" mode of operation. A description of these different modes of operation will now be given.

Read Prompt

As discussed above, in this mode of operation, the user is given a sentence or phrase to speak and the system 1 knows the sentence or phrase and thus knows what the user should say. The phrase or sentence will typically be displayed to the user on a computer display (not shown), although, it could be provided on paper. In response, the user speaks the sentence or phrase into a microphone 3. As shown in FIG. 1*a*, the speech signal generated by the microphone 3 is filtered by a filter 5 that removes frequency components that are not of interest. Typically, the filter 5 will filter out (remove) frequencies below about 80 Hz and above about 4 kHz. The remaining input signal is then sampled and digitised by an analog to digital converter 7 and the digitised samples are stored in the speech data buffer 9.

An audio quality determining unit 11 checks the quality of the input audio data stored in the speech data buffer 9 to confirm that the input speech signal is of a suitable quality. In particular, the audio quality determining unit 11 checks if the audio samples have been clipped through the A/D conversion process and checks the dynamic range of the input speech signal. If the audio has been clipped or if the dynamic range is below a threshold then the audio quality determining unit 11 determines that the audio is of poor quality, whereas if there is no clipping and if the dynamic range of the audio is above a threshold then the audio quality determining unit 11 determines that the audio is of suitable quality. The output from the audio quality determining unit 11 is provided to a controller 13 which controls the overall operation of the speech processing system. If the input audio is not of a suitable quality then the controller 13 rejects the input audio and the user is prompted to say the sentence or phrase again.

Figures 2A, 2B:
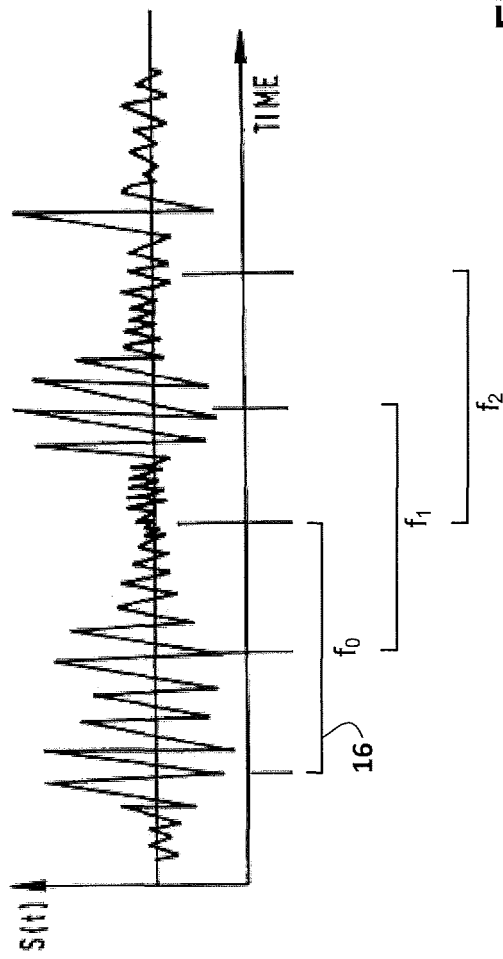
FIGS. 2a and 2b schematically illustrate the way in which an input speech signal is divided into acoustic frames and feature vectors are generated to represent the input speech signal.

If of suitable quality, the speech audio samples in the speech data buffer 9 are processed by an acoustic feature extraction unit 15 which extracts frames of audio samples and determines an acoustic feature vector for each frame representative of the audio signal in that frame. In particular, as illustrated in FIG. 2*a*, the input speech signal is divided into overlapping frames 16 to allow a "short time" analysis of the input speech—as is standard in the field of speech processing. Typically, a frame 16 of samples is extracted once every 10 to 20 milliseconds and the frames 16 may be overlapping (as illustrated) or non-overlapping. As is well known in the art, a windowing function is typically used to extract the frames 16 of samples from the incoming utterance—to reduce distortions introduced by the extraction. Once a frame 16 of samples has been extracted, the acoustic feature extraction unit 15 determines a set of acoustic parameters representative of the audio samples in the frame 16. There are many different types of features or parameters that can be determined and used by the acoustic feature extraction unit 15, such as Cepstral parameters (e.g. mel frequency cepstral coefficients), LPC parameters, Perceptually Based Linear Predictive Analysis (PLP) parameters, Energy parameters, pitch parameters, etc. The way in which these acoustic parameters are determined for the audio samples is well known to those skilled in the art and so will not be described further here.

For the sake of illustration, it will be assumed that the acoustic feature extraction unit 15 determines Cepstral parameters, a pitch parameter and an energy parameter for each frame 16 of audio samples. The acoustic parameters thus generated for a frame 16 of audio samples are arranged into a vector and stored in an acoustic feature vector buffer 17. The acoustic feature extraction unit 15 determines a sequence of these acoustic feature vectors for the input speech utterance, with the position of each feature vector within the sequence corresponding to the position of the corresponding audio samples within the input speech. Thus the first acoustic feature vector in the sequence corresponds to the first frame of audio samples in the input speech and the last acoustic feature vector corresponds to the last frame of audio samples in the input speech. Thus, for any input utterance, a sequence of acoustic feature vectors is generated and stored in the buffer 17, which sequence of acoustic feature vectors is representative of the input utterance. An exemplary sequence of acoustic feature vectors representative of an input utterance is illustrated in FIG. 2*b*. As shown the vectors are labelled with a time stamp—in this case running from time 0 (corresponding to the start of the utterance) to time 28 (corresponding to the end of the utterance).

As illustrated in FIG. 1*a*, the sequence of acoustic feature vectors stored in the acoustic feature vector buffer 17 is processed by a number of different units including a zero detection unit 19, an energy & pitch extraction unit 21, a word alignment unit 23 and a phoneme alignment unit 25. As will be described in more detail below, the zero detection unit 19 processes the sequence of acoustic feature vectors to determine if the user actually said anything or if it is just background noise; and the energy and pitch extraction unit 21 extracts the energy parameter and the pitch parameter from each acoustic feature vector for subsequent use (as will be described in more detail below).

The word alignment unit 23 aligns acoustic models (stored in the mono-phone acoustic model store 27) representing the words that are known to be in the prompted text (as defined in the read prompt words store 29) with the sequence of acoustic feature vectors from the buffer 17 corresponding to what was actually said by the user. This alignment allows the system to detect if speech sounds (such as "eh" or "um" etc.) have been inserted between words of the prompted text and detects if some or all of the words in the prompted text have been skipped (omitted) or repeated by the user. This word alignment unit 23 also determines which pronunciation of a word a user has spoken for any words that are known to have multiple pronunciations as defined by a pronunciation dictionary (PD) 31. The output from the word alignment unit 23 includes a time aligned sequence of words that the word alignment unit 23 determines was spoken by the user and the determined pronunciation of those words. The output from the word alignment unit 23 also includes a time aligned sequence of phonemes corresponding to the determined sequence of words.

The phoneme alignment unit 25 aligns acoustic models (from the mono-phone acoustic model store 27) corresponding to the sequence of phonemes output by the word alignment unit 23 with the sequence of acoustic feature vectors corresponding to the user's utterance (from the buffer 17), whilst allowing for phonemes to be inserted between words and for phonemes to be replaced by other phonemes. This alignment process provides a time aligned sequence of phonemes corresponding to what the user actually said.

The outputs from the zero detection unit 19, the energy and pitch extraction unit 21, the word alignment unit 23 and the phoneme alignment unit 25 are then processed by a speech scoring feature determining unit (hereafter SSFD unit) 33 which determines a number of different speech scoring feature values (as opposed to acoustic feature values) that relate to the way in which the user has spoken the prompted phrase or sentence. These speech scoring feature values (that are representative of the whole utterance) are arranged into a vector of values which is then passed to a machine learning scoring unit 35—which uses the input vector of speech scoring feature values to determine an overall score for the user defining the fluency and/or proficiency of the user's speech, based on pre-learned information that relates these speech scoring feature values to the abilities (fluency and/or proficiency) of different speakers.

Free Speech

As discussed above, in this mode of operation, the user is allowed to say anything they want and so the speech processing system 1 does not know in advance the words that are supposed to be spoken. The main components of the speech processing system 1 used in this mode of operation are shown in FIG. 1*b*. The components that are the same as or similar to those used in the read prompt mode of operation have been given the same reference numeral and so a description of these common components will be omitted. As can be seen by comparing FIG. 1*a* with FIG. 1*b*, the main difference between this free speech mode of operation and the read prompt mode of operation is that, in the free speech mode of operation, the speech processing system 1 has an automatic speech recognition (ASR) system 37. This ASR system 37 is used to determine the sequence of words that the user has spoken, which is then used by the word alignment unit 23 to perform the above described word alignment process. In this embodiment, the ASR system 37 uses different acoustic models (tri-phone models that are stored in the tri-phone acoustic model store 39) to those used by the above described alignment units; and language models (stored in the language model store 41) to recognise the words spoken in the input speech. The ASR system 37 is conventional and will not be described further. The remaining components are the same as those used in the read prompt mode of operation and so a further description will be omitted.

DETAILED DESCRIPTION

A detailed description will now be given of the operation of the above described units.

Zero Detection Unit

The zero detection unit 19 is arranged to determine if anything was spoken by the user. This may be in response to being prompted to speak a predefined text (in the read prompt mode of operation) or being prompted to say anything (in the free speech mode of operation). The zero detection unit 19 does this using a silence alignment unit 41 and a free alignment unit 43.

The silence alignment unit 41 compares and aligns the sequence of acoustic feature vectors corresponding to the input speech (stored in the buffer 17) against one or more acoustic models representing silence (or background noise)—to generate a score or probability that the input speech corresponds to silence. This silence model (or these silence models) forms part of the set of mono-phone acoustic models 27 that are used by the word alignment unit 23 and the phoneme alignment unit 25.

The free alignment unit 43 compares and aligns the sequence of acoustic feature vectors corresponding to the input speech (stored in the buffer 17) against all the mono-phone acoustic models stored in the store 27, with no restriction on the order of the phonemes or where the phonemes may occur in the input speech—to generate a score or probability that something was actually spoken by the user. These mono-phone acoustic models may be template based models or statistical models (such a Hidden Markov Models) that represent different speech sounds of the language. For the English language, there are 44 key sounds or phonemes and a separate model is provided in the store 27 for each sound together with one or more models for silence. If a portion of the input utterance matches well with the model for a phoneme (or silence) then the score (or probability) associated with that part of the utterance matching that model is high. Therefore, the free alignment unit 43 compares different portions of the input utterance with the stored mono-phone acoustic models, to find the sequence of phonemes (and silence) that best matches the input utterance and maintains a cumulative score representing the closeness of the match between the different portions of the input utterance and the phonemes/silence models with which those portions are best matched.

The probabilities from the silence alignment unit 41 and the free alignment unit 43 are passed to a decision unit 45 which uses the determined probabilities to determine if the user said anything or if the input just corresponds to silence (or background noise). If the free-align is not much more probable than the silence align and/or the free align contains a large proportion of silence, then the decision unit 45 outputs a '0' otherwise the decision unit 45 outputs a '1'. The decision made by the decision unit 45 is output to the controller 13 which uses the decision to determine if further processing of the input utterance is needed. In particular, if the decision unit 45 outputs a '0' then no further processing of the sequence of acoustic feature vectors stored in the buffer 17 is needed and the user is prompted to provide their spoken input again. On the other hand, if the decision unit outputs '1' then the controller 13 instructs the word alignment unit 23 to perform its alignment process on the input utterance. Also, in this case, the sequence of phonemes that matches best with the input utterance (as determined by the free alignment unit 43) is passed to the SSFD unit 33.

Word Alignment Unit

As discussed above, the word alignment unit 23 aligns acoustic mono-phone models that represent the words that are known to be in the prompted text (when operating in the read prompt mode of operation) or that represent the words recognised by the ASR system 37 (when operating in the free speech mode of operation), with the sequence of acoustic feature vectors stored in the buffer 17 representing what was actually said by the user. The word alignment process performed by the word alignment unit 23 is slightly different depending on the mode of operation and each will now be described.

Word Alignment—Read Prompt

For 'read prompt', the speech processing system 1 knows what should have been said (the 'prompt' defined by data stored in the read prompt word store 29) but doesn't know whether the user skipped some parts, repeated some or all of the prompt, inserted phonemes or what pronunciation they used for each word. In order that the word alignment unit 23 can consider these possibilities, the word alignment unit 23 creates a network that defines all these possibilities and then uses the mono-phone acoustic models (from the store 27) to find the most likely path through the network by aligning the input utterance (as defined by the sequence of acoustic feature vectors stored in the buffer 17) with these mono-phone acoustic models. As the prompt is known in advance, this network can be defined and stored in advance as part of the read prompt word store 29. In this embodiment, different sub-networks are defined and stored in advance and these are illustrated in FIG. 3 for the prompt 'the cat'. Clearly, in practice the prompt is likely to be much longer than this, but for the sake of illustration and simplification of the sub-networks shown in FIG. 3, this short prompt is considered. The pronunciation dictionary 31 includes a list of known words and one or more phoneme sequences that could be used to pronounce each word. The pronunciation dictionary 31 is generated from models trained on lists created by linguists. The list is not necessarily exhaustive—as there may be some 'correct' pronunciations of words that have not been captured in the dictionary. For simplicity of the following discussion it is assumed that the pronunciation dictionary 31 has two pronunciation for the word 'the' ('the(a)'=/da/ /ah/; and 'the(b)'=/dh/ /ax/) and one pronunciation for the word 'cat' (=/k/ /ae/ /t/).

Figures 3A, 3B, 3C:
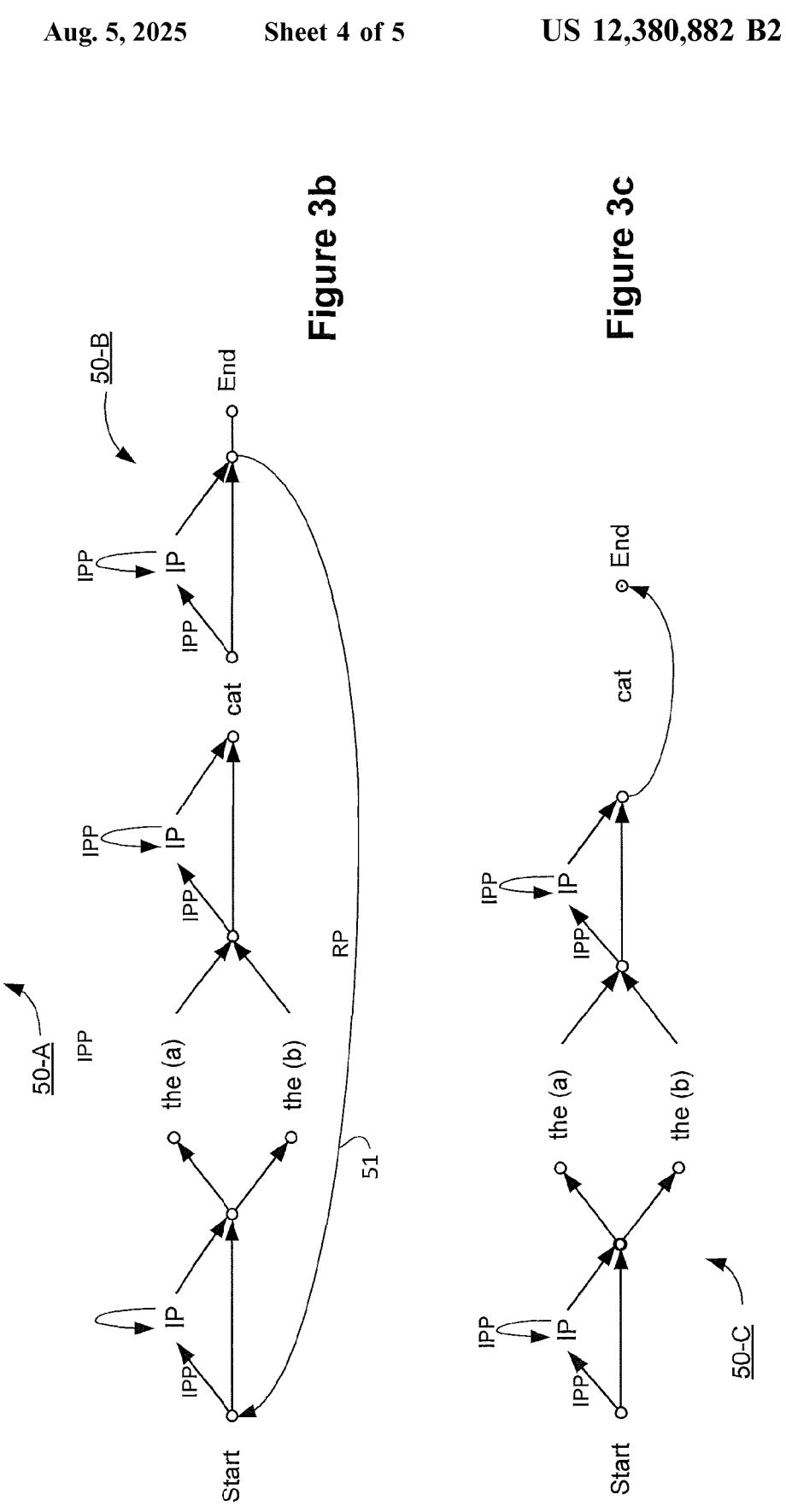
FIGS. 3a, 3b and 3c illustrate sub-networks used by a word alignment unit forming part of the system shown in FIGS. 1a and 1b to control alignment with the sequence of acoustic feature vectors representing the user's utterance.

In order to limit the different possibilities of what the system considers the user might have said, the sub-networks 50 are designed to restrict what can be matched with the input utterance. This helps to speed up the alignment process. FIG. 3a illustrates one of the different sub-networks 50-A that the word alignment unit 23 uses in this embodiment to align with the input utterance. The sub-network 50-A illustrated in FIG. 3a allows for up to a predetermined number of words to be skipped from the start of the read prompt. In this simple illustration, sub-network 50-A allows only the first word of the read prompt to be skipped from the start of the read prompt. FIG. 3b illustrates another one of the three sub-networks 50-B—that allows for the matching of all of the words in the read prompt with at least part of the user's input utterance. Thus in FIG. 3b, no words are skipped. Finally, FIG. 3c illustrates a sub-network 50-C—that allows for up to a predetermined number of words to be skipped from the end of the user's input utterance. In this simple example, sub-network 50-C only allows one word of the read prompt to be skipped from the end of the read prompt. The sub-network 50-A is provided to cater for the situation where the user starts speaking the read prompt before the microphone 3 is switched on and started to record and the sub-network 50-C is provided to cater for the situation where the user did not manage to finish speaking the read prompt before the microphone 3 is switched off.

Each sub-network 50 has a start node (labelled 'start') and an end node (labelled 'end') and the word alignment unit 23 starts the alignment at the start nodes and at the start of the user's utterance and considers any path (represented by the arrows in the sub-networks 50) that finishes at an end node at the end of the user's utterance. As shown, each sub-network 50 includes the two words of the read prompt and separate parallel paths for words having different pronunciations—in this case for the word 'the'. The sub-networks 50 also include paths for inserted phonemes between words (represented by 'IP' in the network 50) to allow for the identification of the user saying "eh" or "um" or the like before, after or between words in the prompt. There are also arrows that loop back after each inserted phoneme to cater for multiple inserted phonemes. In sub-network 50-B, there is also an arrow 51 that extends back from a point just before the end node to the start node. This path allows for the repetition of the read prompt. The sub-networks 50 also allow for the insertion of silence (or pauses) before and after every word and inserted phoneme, although these silence portions are not illustrated in the sub-networks shown in FIG. 3 for the sake of clarity. Thus there are many different paths through the sub-networks 50 from the start nodes to the end nodes—and the word alignment unit 23 considers all these possible paths when matching the sub-networks 50 with the user's input utterance.

In addition to considering paths through each sub-network individually, the word alignment unit 23 also considers paths through limited combinations of the above three sub-networks 50. The limited combinations include: sub-network 50-A followed by sub-network 50-B; sub-network 50-A followed by sub-network 50-B followed by subnetwork 50-C; sub-network 50-A followed by sub-network 50-C; and sub-network 50-B followed by sub-network 50-C. In these combinations, sub-network 50-B may be repeated one or more times. So for example, the best match between the user's input utterance and the sub-networks 50 may be sub-network 50-A, sub-network 50-B, sub-network 50-B and sub-network 50-C. Each time the word alignment unit 23 matches part of the input utterance to one of these sub-networks 50, the word alignment unit 23 counts this as a repetition of the word prompt. As will be described in more detail below, the number of repetitions is used by the speech scoring feature determining unit 33.

The sub-networks 50 shown in FIG. 3 include further simplifications—as the words illustrated in the sub-networks are not actually defined in the sub-networks 50 as 'words', but as the sequence of phonemes that define the pronunciation of the word (obtained from the pronunciation dictionary 31); and when the word alignment unit 23 aligns the input utterance against the sub-networks 50, it is comparing the sequence of acoustic feature vectors corresponding to the user's input utterance (from the buffer 17) with the sequence of mono-phone acoustic models (from store 27) defined by each path through the sub-networks 50.

As the word alignment unit 23 performs the comparison, it maintains a score (or probability) representing the closeness of the match between the mono-phone acoustic models for the path and the corresponding parts of the user's input utterance. Penalties are applied to paths for inserted phones (IPP) and for repeating the prompt (RP). An inserted phoneme can be any one of the phonemes in the mono-phone acoustic model store 27. The word alignment unit 23 considers and scores all path scenarios and prunes (discards) low scoring paths to keep the alignment processing to a manageable amount. In this sense, the alignment performed by the word alignment unit 23 is similar to the alignment that is performed by a speech recognition system when recognising input speech—except the search space for the comparison is restricted by the sub-networks 50 defining the different options for what the user may have said. Accordingly, a further description of how the word alignment unit 23 performs the alignment of the input utterance with the mono-phone acoustic models will not be given here.

The output of the word alignment process includes an identification of the best matching path (typically the path having the highest matching probability) through the network 50 together with the score/probability associated with that path. The identified path defines what the user most likely said. Inserted phonemes are explicitly marked as such in the output so that the inserted phonemes can be tracked and differentiated from the phonemes making up the words of the read prompt. Thus, as an example, when given the prompt 'the cat' the output may identify that the user most likely said "the(a)-cat-eh-the(a)" which indicates that the user tried to repeat the read prompt, but was cut-off before they got to the second word. This also shows that the user inserted an "eh" sound after saying the read prompt the first time. The word alignment unit 23 also identifies portions within the user's utterance when the user said nothing (i.e. when the input speech matches with the silence model in the mono-phone acoustic model store 27). Thus the best path may indicate that the user said: "(sil)-the(a)-(sil)-cat-eh-the(a)-(sil)"; where (sil) corresponds to portions within the input utterance where the user did not say anything.

The output of the word alignment process also includes a time alignment of the words, phonemes (most likely pronunciation for each word), silence portions and insertions of the identified best path through the sub-networks 50, in the user's utterance as well as information on whether the user skipped words from the beginning or end, or repeated anything. This time alignment is illustrated in FIG. 3d for the above example, where the best path indicates that the user actually said: "(sil)-the(a)-(sil)-cat-eh-the(a)-(sil)". In particular, FIG. 3d shows at 57 the words, the silence portions and inserted phonemes (in this case the phoneme/eh/) corresponding to the best path as well as the sequence of acoustic feature vectors 59 (from buffer 17) corresponding to the user's input utterance. FIG. 3d also illustrates, by the dashed lines, where the beginning and end of each word, each portion of silence and each inserted phoneme is located within the sequence of acoustic feature vectors 59. Thus for example, the time alignment identifies that the word "cat" starts at acoustic feature vector $f_{12}$ and ends at acoustic feature vector $f_{17}$. Although not shown in FIG. 3d (for the sake of simplifying the figure), the output of the word alignment process also includes a time alignment (start and end) of the individual phonemes making up each word (as defined in the pronunciation dictionary 31) in the prompt within the sequence of acoustic feature vectors 59.

Word Alignment—Free Speech

For the free speech mode of operation, the alignment is simpler, as the word alignment unit 23 assumes any silence and phoneme insertions in the input utterance will have been detected by the ASR system 37 and will be included in the recognition result output by the ASR system 37. Therefore, the network against which the input utterance is aligned by the word alignment unit 23 just looks like the single path 57 shown in the upper part of FIG. 3d; and the word alignment unit 23 then performs the alignment between this single path and the sequence of acoustic feature vectors representing the user's input utterance. The final output of the word alignment unit 23 (when operating in the free speech mode of operation) includes a time alignment of the words, phonemes (most likely pronunciation for each word), silence portions and insertions from the ASR output within the sequence of acoustic feature vectors representing the user's input utterance.

Phoneme Alignment Unit

The phoneme sequence output by the word alignment unit 23 corresponds to the dictionary (PD 31) definition of how each word in the read prompt should be spoken. Some users (especially those learning the language being tested) will not say the words according to the dictionary pronunciation. The phoneme alignment unit 25 is arranged to detect where the user's spoken utterance differs from the dictionary pronunciation. The phoneme alignment unit 25 does this by performing a second alignment between the mono-phone acoustic models (from the mono-phone acoustic model store 27) corresponding to the sequence of phonemes output by the word alignment unit 23 and the sequence of acoustic feature vectors corresponding to the user's utterance (from the buffer 17). In this second alignment, the phoneme alignment unit 25 allows for phonemes to be inserted between words and for phonemes belonging to a word to be replaced by other phonemes. Therefore, if the user's pronunciation of a word is incorrect, then the phoneme alignment unit 25 will detect this as a replacement of a phoneme from the dictionary pronunciation with another (different) phoneme from the store 27.

When performing this alignment process, the phoneme alignment unit 25 generates a network to restrict the matching process. To illustrate the network used for this phoneme alignment, reference is made to FIG. 4a, which illustrates the network 61 generated using the sequence of phonemes output from the word alignment unit 23 for the above example. As shown in FIG. 4a, the word 'the(a)' has a dictionary pronunciation '/dh/ /ah/' and the dictionary pronunciation of 'cat' is '/k/ /ae/ /t/'. The network 61 includes the repetition of the word 'the(a)' and includes paths to allow for inserted phonemes (IP) and an alternate path for each phoneme of the dictionary pronunciation—to allow for substitution with another phoneme (SP). Although not shown in FIG. 4a for simplicity, the network 61 also allows for silence to be inserted before and after each word/inserted phoneme. The phoneme alignment unit 25 then performs a time alignment between the mono-phone models in the store 27 corresponding to this network 61 and the sequence of acoustic feature vectors in the buffer 17 corresponding to the user's utterance. The phoneme alignment unit 25 maintains scores (or probabilities) representing the closeness of the match between the mono-phone acoustic models for the different paths defined by the network 61 and the corresponding parts of the user's input utterance. Penalties are applied to paths for inserted phones (IPP) and for substituted phonemes (SPP).

FIG. 4b illustrates the resulting sequence of phonemes 63 that the phoneme alignment unit 25 determines best matches the user's input utterance. In this example, the first pronunciation of the word 'the(a)' is different from the dictionary pronunciation—as the /dh/ phoneme has been substituted by the /t/ phoneme; and similarly, the /ae/ phoneme in the word 'cat' has been mispronounced as the phoneme /ah/. FIG. 4b also illustrates the time alignment (represented by the dashed lines) that the phoneme alignment unit 25 determines, between the sequence of phonemes 63 and the sequence of acoustic feature vectors representing the user's utterance.

The phoneme alignment unit 25 outputs this time aligned sequence of phonemes 63 corresponding to what the user actually said together with a confidence score for each phoneme in the sequence 63 indicating how well the aligned portion of the user's input utterance matches with the corresponding acoustic phoneme model. For example, the phoneme alignment unit 25 outputs a phoneme confidence score representing how well the acoustic feature vectors $f_{20}$ and $f_{21}$ match with the mono-phone acoustic model for the phoneme/dh/with which those feature vectors are aligned. These outputs from the phoneme alignment unit 25 are provided to the SSFD unit 33.

Energy & Pitch Extraction Unit

The energy and pitch extraction unit 21 extracts the energy parameter and the pitch parameter from each acoustic feature vector stored in the buffer 17 and provides these extracted parameter values to the SSFD unit 33.

Speech Scoring Feature Determining Unit

As discussed above, the SSFD unit 33 processes the results from the different alignment units and determines various feature values representative of the alignment results. The feature values determined for an utterance are arranged into a vector and output to the machine learning scoring unit 35. The vector of feature values determined by the unit 33 will be referred to as speech scoring feature vectors—and they should not be confused with the acoustic feature vectors (stored in the buffer 17) generated from the audio samples. Examples of different feature values that the SSFD unit 33 may determine are listed below. Some or all of these may be used to form the speech scoring feature vector that is output by the SSFD unit 33 for processing by the machine learning scoring unit 35. The SSFD unit 33 will typically determine different feature values for the read prompt mode of operation and for the free speech mode of operation and so the speech scoring feature vectors generated for these two different modes of operation will be different.

Read Prompt Feature Values:

1) accuracy—is the number of words in the read prompt divided by the number of words plus the number of phonemes inserted between words in the output 57 from the word alignment unit 23.
2) accuracyfa1fa2—is the percentage agreement between the sequence of phonemes in the output 57 from the word alignment unit 23 and the sequence of phonemes 63 output by the phoneme alignment unit 25—phonemes can differ between the two either because of phonemes inserted between words, or because phonemes were substituted for different phonemes during the phoneme alignment process. A lower percentage agreement therefore shows that more phonemes were substituted or inserted in the phoneme alignment process—indicating poor pronunciation.
3) accuracyfa1phones—is the percentage agreement between the sequence of phonemes in the output 57 from the word alignment unit 23 and the sequence of phonemes output by the free alignment unit 43. As the free alignment has no constraints on what phonemes can follow each other, higher agreement here shows that the 'correct' phonemes were more likely.
4) confidence—is the mean phoneme confidence determined by the phoneme alignment unit 25 for the user's input utterance.
5) degVB—is the degree of "voice breaks" within the user's input utterance. This is calculated as the duration of parts of the input utterance between 'voiced parts' of the input utterance divided by the total duration of the voiced parts of the input utterance. A voiced part of the input utterance is a part when the user's vocal cords are vibrating (sounds such as /e/, /a/ etc. as opposed to fricative sounds such as /f/, /s/ etc.) and can be determined from the energy and/or the pitch parameter determined by the acoustic feature extraction unit 15. This duration (and other durations that are calculated—see below) can be calculated in terms of the number of acoustic frames 16 or in seconds by converting the number of acoustic frames into a time using knowledge of the duration of each acoustic frame 16 and the amount of overlap between adjacent frames 16.
6) energyMAD—is the mean absolute deviation of energy in the input utterance. This is determined from the energy values extracted from the sequence of feature vectors stored in the buffer 17 by the energy and pitch extraction unit 21 from the following equation:

$$\frac{1}{n}\sum_{i=1}^{n}|x_i - \bar{x}| \tag{1}$$

Where $x_i$ is the energy within frame i of the user's input utterance; n is the number of acoustic feature vectors within the user's input utterance; and $\bar{x}$ is the average energy within the user's input utterance.

7) energyMean—is the global mean of the energy values extracted by the energy and pitch extraction unit 21 for the user's input utterance.
8) energyRMSE—is a measure of the root mean squared deviation of energy from a trend line of energy that is calculated for the user's input utterance.
9) enPCA1—is the value of the first principal component of the energy values obtained from the energy and pitch extraction unit 21 for the user's input utterance.
10) enPCA2—is the value of the second principal component of the energy values obtained from the energy and pitch extraction unit 21 for the user's input utterance.
11) enPCA3—is the value of the third principal component of the energy values obtained from the energy and pitch extraction unit 21 for the user's input utterance.
12) enPCA4—is the value of the fourth principal component of the energy values obtained from the energy and pitch extraction unit 21 for the user's input utterance.
13) ins—is the number of phonemes inserted between words in the output 57 of the word alignment unit 23.
14) jitter3—is a measure of the pitch instability during the user's input utterance. When determining this feature value, the SSFD unit 33 divides the user's input utterance into adjacent intervals based on the determined pitch value, with each interval being defined as a time period during which the pitch remains substantially constant (ignoring unvoiced parts of the utterance); and then determines how much change there is in the interval durations between neighbouring intervals over the entire input utterance. The calculations for this feature value form part of a standard library of voice analysis tools provided by Praat: http://www.fon.hum.uva.nl/praat/manual/Voice_2_Jitter.html. A more full description of this calculation is given here: http://www.fon.hum.uva.nl/praat/manual/PointProcess_Get_jitter_rap_.html
15) longPauseMAD—is the mean absolute deviation of long pauses (where long pauses are defined as being pauses of duration greater than some threshold (such as 0.25 seconds) between words within the user's utterance). A similar equation to equation (1) used for feature 6) above would be used to calculate this feature value except considering long pauses instead of energy.
16) longPauseMean—is the mean duration of long pauses.
17) longPausePerWord—is the number of long pauses divided by the number of spoken words (as determined from the output 57 of the word alignment unit 23).
18) meanAuto—is the mean autocorrelation of the voiced parts of the user's input utterance.
19) meanWordDuration—is the mean word duration of the words spoken by the user within the input utterance. The number of words spoken by the user and the word durations are determined from the output 57 of the word alignment unit 23.
20) phoPCA1—is the value of the first principal component of the phoneme durations within the user's input utterance.
21) phoPCA2—is the value of the second principal component of the phoneme durations within the user's input utterance.
22) phoPCA3—is the value of the third principal component of the phoneme durations within the user's input utterance.
23) phoPCA4—is the value of the fourth principal component of the phoneme durations within the user's input utterance.

24) pitchMAD—is the mean absolute deviation of the user's pitch within the input utterance. This feature value is again calculated using an equation similar to equation (1) mentioned above, except replacing energy values with the pitch values extracted from the buffer 17 by the energy and pitch extraction unit 21.
25) pitchMean—is the mean pitch within the user's input utterance.
26) pitchSpread—is the difference between the maximum pitch and the minimum pitch within the user's input utterance normalised by the mean pitch.
27) pitPCA1—is the value of the first principal component of the pitch values determined for the user's input utterance.
28) pitPCA2—is the value of the second principal component of the pitch values determined for the user's input utterance.
29) pitPCA3—is the value of the third principal component of the pitch values determined for the user's input utterance.
30) pitPCA4—is the value of the fourth principal component of the pitch values determined for the user's input utterance.
31) pmaxl—is the maximum phoneme duration (excluding phonemes added between words) for the phonemes obtained from the phoneme alignment unit.
32) pmeanl—is the mean phoneme duration (excluding phonemes added between words) for the phonemes obtained from the phoneme alignment unit.
33) psdl—is the standard deviation of the phoneme durations (excluding phonemes added between words) for the phonemes obtained from the phoneme alignment unit.
34) repeats—is how many times the user repeated the prompted text—which is essentially the number of the sub-networks 50 that are traversed when matching the user's input utterance with the sub-networks 50 plus 1 for each time sub-network 50-B is repeated.
35) scorefa1fa2—is the difference in the cumulative confidence score (log probability) output by the phoneme alignment unit 25 for the aligned sequence of phonemes 63 and the cumulative confidence score (log probability) output by the word alignment unit 23 for the sequence of phonemes in its output 57.
36) shimmer2—is a measure of energy instability during the user's input utterance. When determining this feature value, the SSFD unit 33 divides up the user's input utterance into adjacent intervals based on the peak to peak amplitude of the raw speech input signal, with each interval being defined as a time period during which this peak to peak amplitude remains substantially constant (ignoring unvoiced parts of the utterance); and then determines how much change there is in the interval durations between neighbouring intervals over the entire input utterance. The calculations for this feature value also form part of a standard library of voice analysis tools provided by Praat: http://www.fon.hum.uva.nl/praat/manual/Voice_3_Shimmer.html
37) silMAD—is the mean absolute deviation of between-word silence durations within the user's utterance.
38) silPCA1—is the value of the first principal component of the between-word silence durations within the user's input utterance.
39) silPCA2—is the value of the second principal component of the between-word silence durations within the user's input utterance.
40) silPCA3—is the value of the third principal component of the between-word silence durations within the user's input utterance.
41) silPCA4—is the value of the fourth principal component of the between-word silence durations within the user's input utterance.
42) silmax—is the maximum between-word silence duration.
43) silmean—is the mean between-word silence duration.
44) voicePercent—is the percentage of the user's input utterance taken up by any speech.

Free Speech Feature Values:
1) accuracyfa1fa2—is the percentage agreement between the sequence of phonemes in the output 57 from the word alignment unit 23 and the sequence of phonemes 63 output by the phoneme alignment unit 25—phonemes can differ between the two either because of phonemes inserted between words, or because phonemes were substituted for different phonemes during the phoneme align process. A lower percentage agreement therefore shows that more phonemes were substituted or inserted in the phoneme alignment process—indicating poor pronunciation.
2) accuracyfa2phones—is the percentage agreement between the sequence of phonemes 63 output by the phoneme alignment unit 25 and the sequence of phonemes output by the free alignment unit 43. As the free alignment has no constraints on what phonemes can follow each other, higher agreement here shows that the 'correct' phonemes were more likely.
3) bigramRepetitions—is the percentage of bigrams recognised by the ASR that were repetitions of other bigrams recognised by the ASR. A bigram is a pair of words said one after another.
4) confMedian—is the median of the confidence scores generated by the ASR during recognition of the input utterance. As is normal with an ASR system, during the ASR calculations, a lattice is produced which contains all the most likely possible paths through the audio in terms of words and probabilities. These probabilities are derived from both the acoustic matching of the tri-phone models with the audio and the language model scores for the sequences of words, which are combined using a mixing weight that is tuned to give an accurate recognition result. Both knowledge sources (acoustic models and language models) are taken into account when performing ASR and are included in the lattice. Confidence is calculated by looking at all words which are in the lattice at any time point (frame) and normalising to produce a probability for each one. Confidence in a word is the peak normalised probability that the word achieves during the recognition.
5) confMin—is the minimum confidence score generated by the ASR system during recognition of the input utterance.
6) confSD—is the standard deviation of the confidence scores generated by the ASR system during the recognition of the input utterance.
7) degVB—is the degree of "voice breaks"—duration of parts of the input utterance between 'voiced parts' of the input utterance divided by the total duration of the voiced parts of the input utterance. This is the same as feature 5) discussed above for the read prompt mode of operation.
8) energyMAD—is the mean absolute deviation of energy in the input utterance. This is determined from the energy values extracted from the sequence of feature vectors stored in the buffer 17 by the energy and pitch extraction unit 21. This is the same as feature 6) discussed above for the read prompt mode of operation.

9) energyMean—is the global mean of the energy values extracted by the energy and pitch extraction unit 21 for the user's input utterance.

10) ent—is the entropy of the ASR transcript when compared to the overall language model. This feature will be described in more detail below.

11) ent21—is the ratio of entropy of the ASR transcript when compared to the middle and top level language models.

12) ent31—is the ratio of entropy of the ASR transcript when compared to the top and bottom level language models.

13) ent32—is the ratio of entropy of the ASR transcript when compared to the bottom and middle level language models.

14) jitter3—is a measure of the pitch instability during the user's input utterance. This is the same as feature 14) described above for the read prompt mode of operation.

15) longPauseMAD—is the mean absolute deviation of long pauses (where long pauses are defined as being pauses of duration greater than 0.25 seconds between words). This is the same as feature 15) described above for the read prompt mode of operation.

16) longPauseMean—is the mean duration of long pauses. This is the same as feature 16) described above for the read prompt mode of operation.

17) longPausePerWord—is the number of long pauses divided by the number of spoken words. This is the same as feature 17) described above for the read prompt mode of operation.

18) meanAuto—is the mean autocorrelation of the voiced parts of the user's input utterance. This is the same as feature 18) described above for the read prompt mode of operation.

19) meanWordDuration—is the mean word duration of the words spoken within the user's input utterance. This is the same as feature 19) described above for the read prompt mode of operation.

20) phonemean—is the mean phoneme duration of the phoneme durations within the user's input utterance for the phonemes obtained from the word alignment unit.

21) phoneMAD—is the mean absolute deviation of the phoneme durations within the user's utterance for the phonemes obtained from the word alignment unit. This is calculated using a similar equation to equation (1) above except using the phoneme durations rather than energy values.

22) phonemax—is the maximum phoneme duration within the user's utterance for the phonemes obtained from the word alignment unit.

23) phoRMSE—is the root mean squared deviation of phoneme durations from a standard set of phoneme durations for the phonemes obtained from the word alignment unit. This standard set of phoneme durations was calculated on native English speakers to give a benchmark duration to compare for each spoken phoneme.

24) pitchMAD—is the mean absolute deviation of the user's pitch within the input utterance. This is the same as feature 24) described above for the read prompt mode of operation.

25) pitchMean—is the mean pitch within the user's input utterance. This is the same as feature 25) described above for the read prompt mode of operation.

26) pitchSpread—is the difference between the maximum pitch and the minimum pitch within the user's input utterance normalised by the mean pitch. This is the same as feature 26) described above for the read prompt mode of operation.

27) scorefa2phone—is the difference in log probabilities between the cumulative score (log probability) associated with the sequence of phonemes 63 output by the phoneme alignment unit 25 and the cumulative score (log probability) associated with the sequence of phonemes output by the free alignment unit 43.

28) shimmer2—is a measure of energy instability during the user's input utterance. This is the same as feature 36) described above for the read prompt mode of operation.

29) silMAD—is the mean absolute deviation of between-word silence durations within the user's utterance. This is the same as feature 37) described above for the read prompt mode of operation.

30) silmax—is the maximum between-word silence duration within the user's utterance.

31) silmean—is the mean between-word silence duration within the user's utterance.

32) speed—is a measure of how fast phonemes were pronounced by the user in their input utterance, compared to standard phoneme durations calculated on native English speakers.

33) uniqueBigrams—is the number of recognised unique bigrams in the user's input utterance divided by the total number of bigrams in the ASR system (language models).

34) uniqueTrigrams—is the number of recognised unique trigrams in the user's input utterance divided by the total number of trigrams in the ASR system (language models).

35) uniqueWords—is the number of recognised unique words in the user's input utterance divided by the total number of words in the ASR system (pronunciation dictionary).

36) voicePercent—is the percentage of the user's input utterance taken up by any speech.

37) wordRepetition—is the percentage of words recognised by the ASR system that were repetitions of other words recognised by the ASR system.

38) wordsPerSec—is the number of words uttered by the user per second.

As those skilled in the art will appreciate, the order in which these different speech scoring feature values are arranged in the vector is not of importance, as long as it is consistent between the vectors used to train the machine learning scoring unit 35 and the vector generated to assess the user's input speech.

The way in which some of the above speech scoring feature values are calculated will be immediately apparent to those skilled in the art and a further explanation will not be provided here. However, the way in which some of the above speech scoring feature values are calculated will now be described in more detail.

Principle Component Analysis (PCA)

In the read prompt mode of operation, the SSFD unit 33 uses principle component analysis techniques to capture information relating to the main variations within the phoneme durations, silence durations, energy values and pitch values observed within the read prompt being assessed. The inventors have found that these PCA features have reasonable correlation with the final score (assessment) awarded to the user and they do not correlate well with other speech scoring feature values calculated by the SSFD unit 33.

Silence Durations

The way in which the PCA analysis is performed for the silence durations will now be explained. For each read prompt text that the system 1 can present to the user, a separate PCA analysis is performed on training data that is obtained by asking a number of different training users (having known and varying proficiencies/fluencies) to speak the read prompt text. From the speech of each training user, the SSFD unit 33 generates a vector (X: $[x_1, x_2, \ldots x_k]^T$) representing the silence durations observed within the utterance of that particular training user. Thus, if there are 100 training users then 100 vectors will be generated, each one representing the silences observed within the utterance of a respective one of the training users. As the silences may appear at any random point within the input utterance, the vectors generated represent the silence durations within different ranges rather than looking at when those silences occur within the utterance. Thus one element of the vector (X) may represent silence durations of between 0.02 to 0.03 seconds; the next element in the vector may represent silence durations of between 0.03 and 0.04 seconds etc. The value written into an element of a vector for a given training user's utterance is then determined as the number of times a silence duration within the corresponding range is observed within that user's utterance, divided by the total number of silence periods observed within that user's utterance.

The vectors thus generated from the training utterances are arranged into a matrix and a PCA analysis is performed on the matrix to determine silence PCA weights. The way in which this PCA analysis is performed on the matrix of training data is well known and will not be described further here. The silence PCA weights thus determined relate the desired PCA values to the input vector (X) of silence durations as follows:

$$silPCA1 = \sum_{i=1}^{k} w_i^{sil1} x_i \quad (2)$$

$$silPCA2 = \sum_{i=1}^{k} w_i^{sil2} x_i \quad (3)$$

$$silPCA3 = \sum_{i=1}^{k} w_i^{sil3} x_i \quad (4)$$

$$silPCA4 = \sum_{i=1}^{k} w_i^{sil4} x_i \quad (5)$$

Where $x_i$ is the $i^{th}$ element of the vector (X) of silence durations determined for an input utterance; k is the number of elements within the vector (X); $w_i^{sil1}$ is the $i^{th}$ silence PCA weight associated with the first principle component for silence durations; $w_i^{sil2}$ is the $i^{th}$ silence PCA weight associated with the second principle component for silence durations; $w_i^{sil3}$ is the $i^{th}$ silence PCA weight associated with the third principle component for silence durations; and $w_i^{sil4}$ is the $i^{th}$ silence PCA weight associated with the fourth principle component for silence durations.

As mentioned above, these silence PCA weights ($w^{sil}_i$) are calculated from the vectors generated from the training utterances and once calculated are stored in the read prompt store 29. During normal use, when the SSFD unit 33 is performing an analysis of a user's speech that is to be assessed, the vector (X) of silence durations observed within the user's spoken utterance is inserted into equations (2) to (5) above together with the corresponding PCA weights from the store 29 to determine the silence PCA values (silPCA1, silPCA2, silPCA3 and silPCA4).

Phoneme Durations

The way in which the PCA analysis is performed for the phoneme durations is the same as for the silence durations discussed above, except using phoneme durations rather than silence durations. A further explanation will not therefore be given.

Energy

The way in which the PCA analysis is performed for the energy values is slightly different. In this case, again a separate set of PCA weights are determined for each different read prompt that can be presented to a user. In this case, however, the mean energy value that is determined for the training utterance is subtracted from the individual energy values calculated for the utterance. The resulting values are then arranged into a vector having a fixed number of elements—for example 500:

$$[(e_0-\bar{e}),(e_1-\bar{e}),(e_2-\bar{e}),(e_3-\bar{e}), \ldots (e_{500}-\bar{e})]^T$$

Where $e_i$ is the energy value within the $i^{th}$ frame 16 of the input utterance and e is the mean energy within the input utterance. If the input utterance does not contain sufficient speech to generate the desired 500 energy values or if it contains more than the desired 500 values, then interpolation/extrapolation is used to determine the desired fixed number of energy values for the vector. The fixed number of energy values is typically selected depending on the length of the read prompt or the average number of energy values that were generated for that specific read prompt within all the training utterances. The training vectors of energy values thus produced are arranged into a matrix as before and a PCA analysis is performed to determine the energy PCA weights which are then stored in store 29.

During normal use, when the SSFD unit 33 is performing an analysis of a user's speech that is to be assessed, the SSFD unit 33 determines the mean energy value of all of the energy values obtained for the input utterance. The SSFD unit 33 then subtracts this mean energy value from the individual energy values and then generates a vector of energy values for the new input utterance that is being evaluated:

$$[(e_0-\bar{e}),(e_2-\bar{e}),(e_2-\bar{e}),(e_3-\bar{e}), \ldots (e_{500}-\bar{e})]^T$$

This input vector is then combined with the energy PCA weights from the store 29 to generate enPCA1, enPCA2, enPCA3 and enPCA4 using similar equations to those defined above (equations (2) to (5)) for the silence PCA values.

Pitch

The way in which the PCA analysis is performed for the pitch values is the same as for the energy values discussed above, except using pitch values rather than energy values. A further explanation will not therefore be given.

Entropy & Perplexity

Perplexity is a standard measure in the field of speech recognition and entropy is the logarithm of perplexity (and is normally used as it is more convenient in many cases).

The definition of perplexity is:

$$\text{Perplexity} = b^{-\frac{1}{N}\sum_{i=1}^{N} \log_b q(x_i)} \quad (6)$$

Where b is any number (typically either 2 or e); the sum is over all words in the recognition result output by the ASR system 37 in response to the user's input utterance; and $q(x_i)$ is the probability of word $x_i$ given its context according to the language model being used. In this embodiment four different language models (LMs) are used to define $q(x_i)$ in order to generate different entropy measures:

1) A "main LM" that is also used by the ASR system 37 and that is trained on various English language resources including transcription of English speaking tests taken by learners, texts of English writing tests taken by learners, transcriptions of English spoken by natives and texts of English written by natives, combined in proportions that optimised the ability of the system to separate English speaking test learner example data. This language model is used to determine the 'ent' feature using the above equation.
2) A "good level" LM that is trained on the output from the ASR system 37 obtained by processing the speech of students that are considered to have good fluency and proficiency of the language being assessed.
3) A "medium level" LM that is trained on the output from the ASR system 37 obtained by processing the speech of students that are considered to have a medium fluency and proficiency of the language being assessed.
4) A "bottom level" LM that is trained on the output from the ASR system 37 obtained by processing the speech of students that are considered to have poor fluency and proficiency of the language being assessed.

The main language model represents the way in which the language being assessed should be spoken and is typically trained by analysing different documents and speeches that are commonly available (e.g. from on-line databases). The perplexity feature effectively provides a measure of how surprising the sequence of words that the ASR system 37 outputs is, in response to the user's input utterance given the language model. If the sequence of words output by the ASR 37 match well with what is expected by the language model, then the probabilities $q(x_i)$ will be high and the resulting perplexity value will be low. Of course, users who are trying to learn a language are unlikely to say everything perfectly and as expected by the main language model—which is trained on documents and speech of users who are fluent/native of the language. Hence in this embodiment, the system uses three new language models—which effectively model the grammar and vocabulary used by users of different proficiencies and fluencies. Therefore, given the ASR transcript for a user's speech that is to be assessed, by comparing that sequence of recognised words with the different language models, the SSFD unit 33 determines a perplexity (entropy) score representing how surprising the recognised speech is given the different language models associated with the different levels of user proficiency/fluency.

The inventors also found that taking the ratio of the entropy scores obtained using the different language models provides features that correlate well to the assessment score to be calculated. Thus, in this embodiment, the SSFD unit 33 determines the ratio of the different perplexities (entropies) obtained using the different language models:

"ent21"—is the ratio of entropy of the ASR transcript for the top level language model to the entropy of the ASR transcript for the middle level language model.
"ent31"—is the ratio of entropy of the ASR transcript for the top level language model to the entropy of the ASR transcript for the bottom level language model.
"ent32"—is the ratio of entropy of the ASR transcript for the middle level language model to the entropy of the ASR transcript for the bottom level language model.

Machine Learning Scoring Unit

As discussed above, the speech scoring feature vector output by the SSFD unit 33 is passed to the machine learning scoring unit 35 which uses the vector to determine a score for the user's utterance that represents the system's assessment of the user's proficiency and/or fluency in the language being tested. Various different machine learning techniques can be used such as neural networks, Support Vector Machines, clustering etc. Typically, the machine learning scoring unit 35 is trained by providing as inputs numerous speech scoring feature vectors obtained from the SSFD unit 33 as a result of analysing the input speech from various different users of different fluencies/proficiencies of the language being tested. The fluencies/proficiencies of these training users are known in advance and determined by human examiners. Therefore, the machine learning scoring unit 35 can learn a pattern between the input vectors it receives and the scores that the scoring unit 35 should output if the automatic output is to match with the human score. Once trained, when a speech scoring feature vector is applied to its input, the scoring unit 35 will output a score defining the system's assessment of that user's input speech. This automatically determined assessment can then be fed-back instantly to the user just after they have input their spoken utterance.

One preferred training method uses 'rank preference' to train the machine learning scoring unit 35. This training method is described in US2012/088219, the contents of which are incorporated herein by reference. This method essentially takes pairs of training vectors, i.e. pairs of speech scoring feature vectors obtained from the SSFD unit 33 for speech input from pairs of users of different standards. The pairs of training vectors are ranked so that knowledge is provided about which training vector of each pair is obtained from the user whose speech is of a higher standard in the language being tested. A difference vector is determined for each pair of training vectors and these difference vectors are used to train a model that is able to differentiate between the training vectors in the different pairs (i.e. is able to identify which of the pair of training vectors is from the user of the higher standard). Once trained, a speech scoring feature vector obtained from the SSFD unit 33 for a new user to be assessed is paired with a 'standard' speech scoring feature vector (obtained from the speech of a user of 'standard' fluency/proficiency) and the difference between this pair of vectors is applied to the model. The model outputs a score that indicates whether and by how much the user's input speech is better or worse than the speech of the 'standard' level.

One problem the inventors faced with this training technique was that they had more training speech from users of a low standard than they had of training speech from users of a high standard. To avoid the model being biased towards lower quality speech, the inventors constrained the training so that the training vectors obtained from the speech of users of a high standard were paired with other training vectors more often than the training vectors obtained from users of a lower standard.

Modifications and Alternatives

Embodiments of the invention have been described above. As those skilled in the art will appreciate, a number of modifications and alternatives can be made to the above embodiments whilst still benefiting from the inventions embodied therein. By way of illustration some of these alternatives and modifications will now be described.

The speech assessment system 1 described above was designed to be able to assess free speech or prompted speech. In alternative embodiments, the system may be designed to be able to assess only one of these.

In the above embodiments, the ASR system 37 recognised the words within the user's input utterance using tri-phone acoustic models. This is not essential. The ASR 37 may instead use the mono-phone acoustic models to recognize the input speech. However, the use of tri-phone models is preferred as it leads to higher accuracy recognition results.

In the above embodiments, the SSFD unit 33 used three language models generated from the speech of users having different levels of proficiency and/or fluency. As those skilled in the art will appreciate, it is not essential to use three of these language models. The SSFD unit 33 may use more than three of these language models or less than three of these language models.

In the above embodiments, the word alignment unit identified the best path (the path having the highest matching probability) through the networks 50 when aligning the input utterance with the stored models associated with the different paths. As those skilled in the art will appreciate, it is not essential to identify the "best" path. The second best, or third best etc. could be identified instead. Also, it is not essential to define the network using the sub-networks described above. A single network may define the paths or other sub-networks may be provided to define other places within the read prompt where words may be skipped or repeated. Similarly, the networks do not have to take the form illustrated in the drawings, other similar networks could be used. Further, whilst the networks have been illustrated graphically in the accompanying figures, they will typically be defined by data that defines the sequence of nodes within the network and the paths connecting those nodes. The purpose of the networks is to restrict the search space when aligning the user's input utterance to the known read prompt or to the recognition result output from the automatic speech recognition system.

In the above embodiments, different data stores were provided for storing the acoustic speech models, the pronunciation dictionary and the read prompt text. As those skilled in the art will appreciate, all or some of these data stores may be provided by a single data store. Similarly, in the above embodiments, the network 50 representing all the possible utterances that the user may say in response to the read prompt text, was stored in the read prompt store 29. This is not essential—the network 50 may be stored in a separate data store.

In the above embodiments, the pronunciation dictionary included multiple pronunciations for any words known to have multiple different pronunciations. In an alternative embodiment, the pronunciation dictionary may store data identifying a single pronunciation for each word in the dictionary.

In the above embodiments, the different alignment units aligned the mono-phone acoustic models with the user's input utterance. As those skilled in the art will appreciate, other acoustic speech models could be used. For example, diphone or triphone acoustic models could be used instead.

The invention claimed is:

1. A speech processing system comprising:
    an input for receiving an input utterance spoken by a user;
    a speech recognition system that recognizes the input utterance spoken by the user and that outputs a recognition result comprising a sequence of recognized textual words, and an additional sequence of recognized sub-word units corresponding to the input utterance;
    an acoustic model store that stores acoustic speech models;
    a word alignment unit configured to receive the sequence of recognized textual words and the sequence of recognized sub-word units output by the speech recognition system and to align a sequence of said acoustic speech models corresponding to the received sequence of recognized textual words and the received sequence of recognized sub-word units with a sequence of acoustic feature vectors representing the input utterance spoken by the user and to output an alignment result identifying:
        a time alignment between each word of the received sequence of recognized textual words and the sequence of acoustic feature vectors representing the input utterance spoken by the user that identifies where each recognized textual word is located within the sequence of acoustic feature vectors representing the input utterance spoken by the user;
        a time alignment between each sub-word unit in the sequence of recognized sub-word units and the sequence of acoustic feature vectors representing the input utterance spoken by the user that identifies where each sub-word unit is located within the sequence of acoustic feature vectors representing the input utterance spoken by the user;
    a speech scoring feature determining unit configured to use:
        i) the time alignment between each word of the received sequence of recognized textual words and the sequence of acoustic feature vectors representing the input utterance spoken by the user that identifies where each recognized textual word is located within the sequence of acoustic feature vectors representing the input utterance spoken by the user; and
        ii) the time alignment between each sub-word unit in the sequence of recognized sub-word units and the sequence of acoustic feature vectors representing the input utterance spoken by the user that identifies where each sub-word unit is located within the sequence of acoustic feature vectors representing the input utterance spoken by the user;
    output from the word alignment unit to determine a plurality of speech scoring feature values for the input utterance; and
    a scoring unit operable to use the plurality of speech scoring feature values for the input utterance determined by the speech scoring feature determining unit, to generate a score representing language ability of the user.

2. The speech processing system of claim 1, wherein the word alignment unit is configured to output a sequence of sub-word units corresponding to a dictionary pronunciation of the recognized input utterance.

3. The speech processing system of claim 1, wherein the word alignment unit is configured to output a sequence of sub-word units corresponding to a dictionary pronunciation of the matching possible utterance.

4. A speech processing system according to claim 3, further comprising a sub-word alignment unit configured to receive the sequence of sub-word units corresponding to the dictionary pronunciation and configured to align the sequence of sub-word units corresponding to the dictionary pronunciation received from the word alignment unit with the input utterance spoken by the user whilst allowing for sub-word units to be inserted between words and for sub-word units of a word to be replaced by other sub-word units to determine where the input utterance spoken by the user differs from the dictionary pronunciation and to output a sequence of sub-word units corresponding to an actual pronunciation of the input utterance spoken by the user.

5. A speech processing system according to claim 4, wherein the sub-word alignment unit is configured to use the sequence of sub-word units corresponding to the dictionary pronunciation of the recognized input utterance to generate a network having a plurality of paths allowing for sub-word units to be inserted between recognized words and for sub-word units of a recognized word to be replaced by other sub-word units and wherein the sub-word alignment unit is configured to align acoustic speech models for the different paths defined by the network with the input utterance spoken by the user.

6. A speech processing system according to claim 5, wherein the sub-word alignment unit is configured to maintain a score representing the closeness of the match between the acoustic speech models for the different paths defined by the second network and input utterance spoken by the user.

7. A speech processing system according to claim 4, further comprising a speech scoring feature determining unit configured to receive and to determine a measure of similarity between the sequence of sub-word units output by the word alignment unit and the sequence of sub-word units output by the sub-word alignment unit.

8. A speech processing system according to claim 1, further comprising a free align unit configured to align acoustic speech models with the input utterance spoken by the user and to output an alignment result including a sequence of sub-word units that matches with the input utterance spoken by the user.

9. A speech processing system according to claim 1, wherein the score represents the fluency and/or proficiency of the user's spoken utterance.

10. A speech processing method comprising:
receiving an input utterance spoken by a user;
using a speech recognition system to recognize the input utterance spoken by the user and to output a recognition result comprising a sequence of recognized textual words and an additional sequence of sub-word units corresponding to the input utterance; and
receiving the sequence of recognized textual words and the sequence of recognized sub-word units output by the speech recognition system and aligning a sequence of acoustic speech models corresponding to the received sequence of recognized textual words and the sequence of recognized sub-word units with a sequence of acoustic feature vectors representing the input utterance spoken by the user; and
outputting an alignment result identifying:
a time alignment between each word of the received sequence of recognized textual words and the sequence of acoustic feature vectors representing the input utterance spoken by the user that identifies where each recognized textual word is located within the sequence of acoustic feature vectors representing the input utterance spoken by the user; and
a time alignment between each sub-word unit in the sequence of recognized sub-word units and the sequence of acoustic feature vectors representing the input utterance spoken by the user that identifies where each sub-word unit is located within the sequence of acoustic feature vectors representing the input utterance spoken by the user;
using;
  i) the time alignment between each word of the received sequence of recognized textual words and the sequence of acoustic feature vectors representing the input utterance spoken by the user that identifies where each recognized textual word is located within the sequence of acoustic feature vectors representing the input utterance spoken by the user; and
  ii) the time alignment between each sub-word unit in the sequence of recognized sub-word units and the sequence of acoustic feature vectors representing the input utterance spoken by the user that identifies where each sub-word unit is located within the sequence of acoustic feature vectors representing the input utterance spoken by the user;
to determine a plurality of speech scoring feature values for the input utterance; and
using the determined plurality of speech scoring feature values for the input utterance to generate a score representing language ability of the user.

* * * * *